United States Patent Office 3,525,673
Patented Aug. 25, 1970

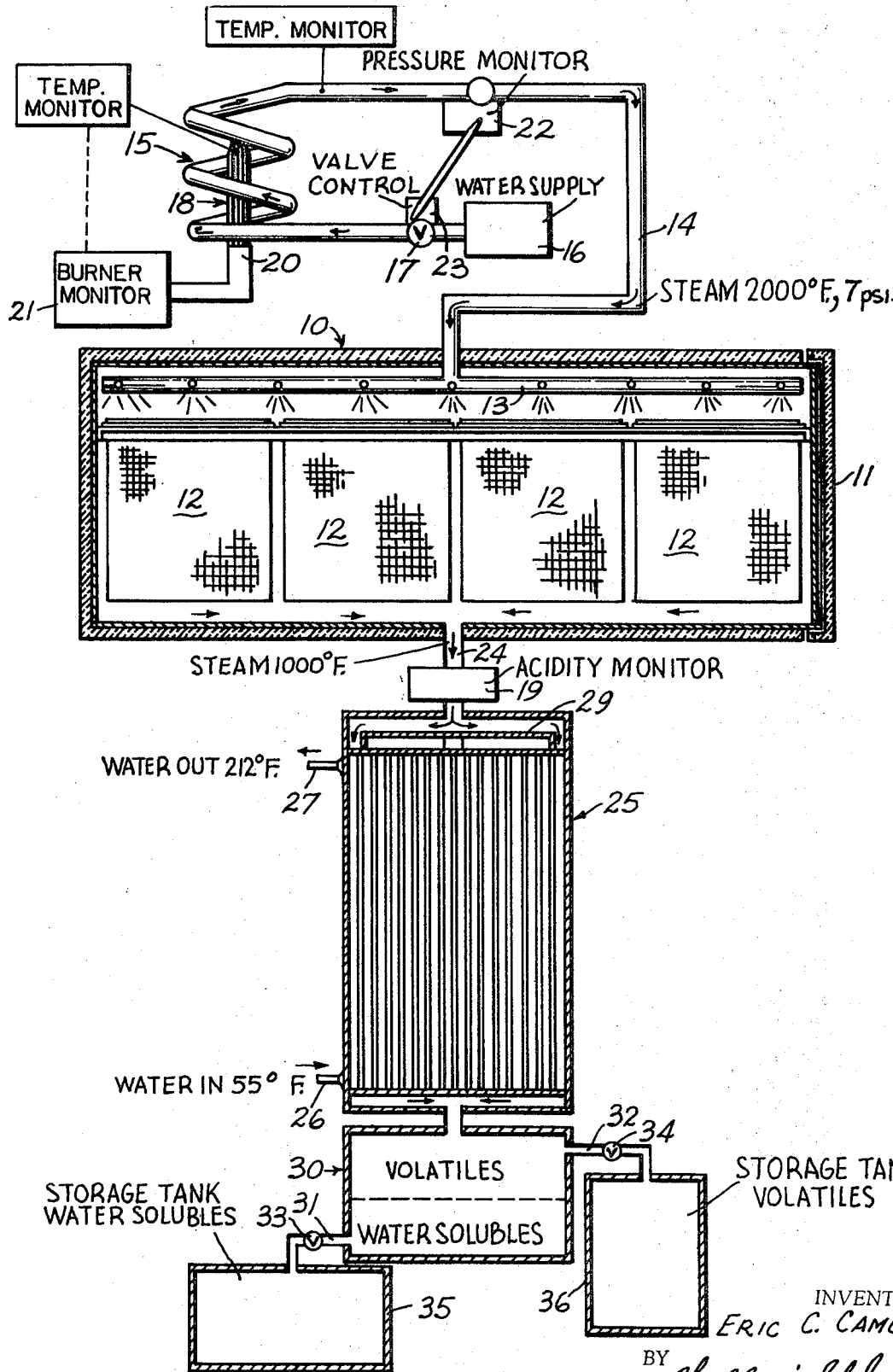

3,525,673
CLOSED, CONTROLLED SYSTEM FOR CARBONIZING ORGANIC REFUSE
Eric C. Cameron, Box 1554, Yakima, Wash. 98901
Continuation-in-part of application Ser. No. 640,323, May 22, 1967. This application Mar. 24, 1969, Ser. No. 826,739
Int. Cl. C10b *49/00, 53/00*
U.S. Cl. 201—1
4 Claims

ABSTRACT OF THE DISCLOSURE

A method for treating organic refuse wherein the refuse is reduced to basic carbon by subjecting it to the passage of superheated steam at low atmospheric pressures within a closed system. The refuse is thereby converted to usable carbon products, and the volatile gases and dissolved materials can be condensed and either salvaged or discarded without the usual pollution problems associated with refuse disposal.

RELATED APPLICATIONS

This application is a continuation-in-part application to a copending U.S. application, Ser. No. 640,323, May 22, 1967 which has since been abandoned.

BACKGROUND OF THE INVENTION

The method of treating organic refuse disclosed herein is carried out in a closed system without the production of flue gases or other waste material discharged in the air that might contribute to air pollution. The resulting solid and liquid materials can be disposed of without contributing to water pollution problems.

The necessity of improved refuse disposal is well recognized, particularly in the more developed countries and communities throughout the world. Increasing population, the trend toward urban communities, the adoption of disposable products and an increasing willingness to discard used products are relentlessly adding to the mass of refuse and to increased attention being directed to present day methods of refuse disposal by government, industry and consumers. These methods typically involve either sanitary land fill methods, open burning dumps or incinerator processes. Of these methods, sanitary land fill methods do provide a nuisance-free solution to the disposal of waste materials, but this method consumes substantial areas of land, which are becoming increasingly unavailable in larger urban areas.

As used herein the designation "organic refuse" generally indicates all solid wastes produced through home, industrial and commerical activities which are organic in nature and which generally are combustible. The present method can be successfully used in treating such refuse, which includes garbage resulting from food preparation, organic trash, paper, wood and other organic materials. It is not applicable to the disposal of metals or certain plastics which do not reduce to solid carbon under heat, but which melt without decomposition. While small percentages of such materials can be accommodated, large quantities of incombustible materials would negate the usefulness of the method.

The method disclosed herein can be successfully utilized in both large and small scale operations. It can be used, as an example, for the disposal of paper and other refuse collected each day in a large office building. Apparatus for carrying out the method can be located in the building and no stack or other pollution contributing arrangement is required.

OBJECTS AND BRIEF DESCRIPTION OF THE INVENTION

One object of the invention is to provide a closed system of refuse disposal capable of producing useful by-products without contributing to the pollution of either air or water resources.

Another object of the invention is to provide an efficient manner of reducing organic refuse to basic carbon which can then be utilized in conventional sewer systems to add to the purification of the system.

Another object of the method is to provide a process that can be used in any enclosed building and which can be adapted for use in any controlled envrionment.

The method basically involves the application of superheated steam of approximately 2000° F. at a low atmospheric pressure of about 7 p.s.i.g. to volatilize the material in the refuse, these volatilized materials being carried with the steam or being dissolved for recovery by a subsequent condensing step. The solid materials are thereby reduced to basic carbon, which will be in the form of coke, charcoal or lampblack. Under many conditions, the carbon products will be usable in industrial markets. In any regard, the disposal of carbon without contributing to air or water pollution poses little problem.

DESCRIPTION OF THE DRAWING

The figure shows a schematic diagram of the basic apparatus utilized in conjunction with the described method.

DESCRIPTION OF THE PREFERRED EMBODIMENT

According to this method, organic refuse of any combustible or decomposable type is subjected to low pressure superheated steam. The application of superheated steam is continued until the solid material is reduced to basic carbon. The exiting steam and volatile gases are then condensed into liquid form. The water soluble products can be mechanically separated from those that are insoluble in water. These materials can then be handled efficiently in burning processes or in other recovery processes for further material treatment.

Referring to the drawing, there is shown generally at 10 a large retort tank that is completely enclosed and sealed. For access, the tank 10 is provided with a movable door 11 that seals one end thereof. The tank 10 and door 11 are preferably insulated to minimize heat loss and to retain the high temperatures utilized in the process. Insulation is required to make the process compatible with usual building temperature conditions.

Organic refuse, of any type, is placed within the retort tank 10 in expanded metal containers generally shown at 12. The containers 12 provide an easy manner of handling the solid material in batches, and permit free access of incoming superheated steam to the surfaces of the solid organic refuse contained therein. The containers 12 can be suspended within the retort tank 10 in any desired manner, as by the use of longitudinal tracks along the side walls of tank 10.

Superheated steam is applied to the refuse within the retort tank 10 by a perforated header 13 that extends along the length thereof directly above the containers 12. The header 13 is in open communication with a supply pipe 14 provided with superheated steam from a steam generator shown as a heating coil 15. The coil 15, preferably of stainless steel, is connected to a water source 16 by means of a precise flow control valve 17. A high-temperature flame 18 is provided through the center of the coil 15 from a burner 20 connected to a burner control and fuel source at 21. It should be noted that the refuse is heated by the superheated steam and not by external heat applied to the retort tank.

The operation of this method requires careful control of the temperature and pressure of the steam provided through inlet pipe 14. The temperature of the steam can be controlled generally by controlling the temperature of flame 18. Burner conditions are preferably utilized which will maintain a flame temperature of about 2400° F. With a flame temperature of this magnitude, water entering the coil 15 is instantly changed to steam and superheated to a temperature of about 2000° F. The positive pressure of the steam is detected by a pressure monitoring device 22 that operatively controls a valve control unit 23 connected to valve 17. The monitoring unit 22 should be set generally to maintain a pressure within pipe 14 of approximately 7 p.s.i.g. The pressure is maintained by regulating the amount of water provided to coil 15 by varying the setting of valve 17. When the pressure of the steam rises, the flow of water to coil 15 is decreased. The preferred steam condition at pipe 14 is such that the steam temperature is approximately 2000° F. and the pressure is between 4 to 9 p.s.i.g. The temperature will vary within limits of 200° or 300°, but should be maintained as close to 2000° as is practical. The pressure should be maintained at about 7 p.s.i.g. Below 4 p.s.i.g. the flow of steam about the containers 12 will generally be inadequate for practical reduction purposes Above 9 p.s.i.g. mechanical difficulties are encountered in designing the pressure vessel and the higher pressures result in the volatile substances in the refuse becoming entrapped so that they are not removed from the solid carbon residue. The low positive pressure enables the volatile elements to easily flow to the condenser unit without providing a pump or other means for moving the volatile elements.

The time of application of superheated steam to the refuse will vary depending upon the volume of refuse being treated and the steam flow rate. The application of steam should be continued for a duration of time adequate to reduce the solid residue of refuse to basic carbon. Traces of mineral materials might still remain in the solid mass. The effectiveness of the process can be monitored by measuring the acidity of the steam and volatile materials leaving tank 10 through the lower pipe 24. A monitoring unit is indicated generally at 19. When the acidity monitored at pipe 24 is neutral, the flow of incoming superheated steam can be stopped, the carbon can be removed from tank 10 and the tank can be subsequently recharged.

The superheated steam and volatile substances carried with it exit through lower pipe 24 and are directed to the upper end of a vertical condenser assembly shown at 25. The condenser 25 is simply an upright sealed tank through which the steam and volatile materials pass downwardly through tubes subjected to a constant flow of water from an inlet water connection 26 to an outlet connection 27. A dispensing baffle is provided at 29. The temperature of the exiting superheated steam and materials in the pipe 24 is about 1000° F. The incoming water at connection 26 can be at normal ground water temperature (about 55° F.). The exiting water at connection 27 should be at the boiling point of water (approximately 212° F.). The materials passed through the condenser will therefore be subjected to a gradual cooling process from 212° to 55°.

By cooling the stream of water and gas to a temperature of approximately 55°, all of the water and gases will be liquified. The liquified products exiting at the lower connection 28 of the condenser assembly 25 then pass to a separation pot 30 with an upper inlet connection at 31. The liquids settle within the pot 30. The condensed water and water-soluble products can be drawn from pot 30 through a lower exit 31. The lighter insoluble products can be drawn through an upper exit 32. The flow of materials through these exits is controlled respectively by valves 33 and 34. Storage tanks 35 and 36 are provided for the water and dissolved products and for the insoluble products respectively.

One advantage of this process is that it can be carried out in a completely closed system so that no gases or other materials are released to the environmental atmosphere during reduction of the refuse. The method can therefore be adapted to use in any restricted environment, including office buildings and apartments in highly populated areas. No vents or stacks are required that would contribute to air pollution difficulties. No water used in the process is contaminated except that collected in tank 35. The dissolved materials in tank 35, such as soluble acids and alcohols, can be separated and recovered by distillation, removing the water in the form of pure steam. The insoluble volatile materials collected in tank 36 can be burned efficiently using conventional liquid burning processes. In fact, the combustible materials in tank 36 can be used as fuel to provide the flame required at 18. The burning of liquid fuels conventionally can be accomplished with much greater efficiency than the burning of assorted refuse.

The carbon produced by this method as an end product of the solid waste can find profitable marketing acceptance in certain industries where charcoal or lampblack is required. However, even as a waste material, such carbon can be disposed of without contamination of existing waste disposal facilities. Solid carbon is generally acceptable in sewer systems, where it actually contributes to the disposal of waste by its adsorption characteristics. The carbon also can be buried or used as a solid additive.

The physical characteristics of the apparatus used in carrying out this method can be varied considerably. The structure involved can be adapted to any required capacity and the arrangement of the various components can be modified to meet the requirements of a particular application. The general concept described above, concerned with the use of low atmospheric pressure superheated steam to reduce organic refuse to carbon can be effectively carried out in a closed system regardless of its particular size or arrangement.

Having thus described my invention, I claim:

1. A method of pyrolyzing organic refuse, namely all solid wastes produced through home, industrial and commercial activities which are organic in nature and generally combustible to render the refuse more acceptable for disposal without creating pollution, comprising the following steps:

placing the refuse in a sealed retort tank;

subjecting the refuse to the direct application of a stream of superheated steam within the retort tank at a high temperature and low positive pressure to completely pyrolyze the refuse;

monitoring the temperature and pressure of the steam directed into the tank;

controlling the temperature of the steam in response to the monitored temperature;

controlling the pressure of the steam in response to the monitored pressure;

measuring the acid content of the vaporized material leaving the tank to detect the presence of other substances in the spent steam;

continuing the application of steam into the tank in response to the measured acid content until such time as the spent steam contains no other substances and the organic refuse within the tank has been reduced to basic carbon;

and condensing the spent steam and substances carried therewith.

2. A method as set out in claim 1 wherein the superheated steam to which the refuse is subjected is directed into the tank at a temperature of approximately 2,000° F. and at a pressure of four to nine p.s.i.g.

3. A method as set out in claim 1 wherein the spent steam leaves the tank at a temperature of approximately 1,000° F.

4. A method as set out in claim 1 wherein the steam is generated within a coil connected to a source of water and subjected to a burner flame, the method including the steps of monitoring the temperature of the flame, and the step of monitoring the pressure of steam leaving the coil and adjusting the amount of water supplied to the coil from said source so as to vary the steam pressure directed to the retort tank.

References Cited

UNITED STATES PATENTS

| | | | |
|---|---|---|---|
| 1,909,397 | 5/1933 | Frye | 201—38 |
| 2,276,342 | 3/1942 | Records et al. | 201—38 |
| 3,186,923 | 6/1965 | Lyness | 201—38 |

WILBUR L. BASCOMBE, Jr., Primary Examiner

D. EDWARDS, Assistant Examiner

U.S. Cl. X.R.

110—11; 201—25, 38